(12) United States Patent
Diemer et al.

(10) Patent No.: US 7,473,357 B2
(45) Date of Patent: Jan. 6, 2009

(54) FILTRATION DEVICE

(75) Inventors: Wolfgang Diemer, Waldstetten (DE); Martin Zeiler, Schwäbisch Gmünd (DE)

(73) Assignee: Pall Corporation, East Hills, NY (US)

(*) Notice: Subject to any disclaimer, the term of this patent is extended or adjusted under 35 U.S.C. 154(b) by 243 days.

(21) Appl. No.: 10/863,383

(22) Filed: Jun. 9, 2004

(65) Prior Publication Data

US 2005/0056583 A1    Mar. 17, 2005

Related U.S. Application Data

(63) Continuation of application No. PCT/EP02/14555, filed on Dec. 19, 2002.

(30) Foreign Application Priority Data

Dec. 21, 2001  (DE) ................. 101 63 612

(51) Int. Cl.
*B01D 29/96*    (2006.01)
(52) U.S. Cl. .............. 210/232; 210/236; 210/329; 210/330; 210/328; 210/323.2; 210/345
(58) Field of Classification Search ............... 210/232, 210/236, 329, 330, 328, 323.2, 345
See application file for complete search history.

(56) References Cited

U.S. PATENT DOCUMENTS

| 1,083,305 | A | * | 1/1914 | Sweetland | 210/232 |
| 3,455,357 | A | * | 7/1969 | Zink | 425/153 |
| 3,598,243 | A | * | 8/1971 | Gutkowski | 210/340 |
| 3,980,560 | A | * | 9/1976 | Eades | 210/141 |
| 4,257,888 | A | * | 3/1981 | Kudryavtsev et al. | 210/97 |
| 5,122,286 | A | * | 6/1992 | Kreyenborg et al. | 210/791 |

FOREIGN PATENT DOCUMENTS

| DE | 229066 | * | 2/1908 |
| DE | 206408 | | 2/1909 |
| DE | 1 461 407 | | 12/1968 |
| DE | 3935483 | * | 5/1991 |
| EP | 0 982 059 B1 | | 1/2000 |
| GB | 754023 | | 8/1956 |

* cited by examiner

*Primary Examiner*—Thomas M Lithgow
(74) *Attorney, Agent, or Firm*—Leydig, Voit & Mayer, Ltd.

(57) ABSTRACT

A filtration device for filtration, comprising at least one filter unit in a closed filter housing, comprises at least one filtration station and a loading and removing station. The filter housing can be opened in at least one parting plane transversely to the longitudinal axis of the filter housing and is movable between the loading and removing station and the filtration station.

15 Claims, 4 Drawing Sheets

FILTRATION DEVICE

The present application is a continuation of International Application No. PCT/EP02/14555 which was filed on Dec. 19, 2002, designating the United States of America and other countries, and which claimed priority of German Application No. DE 101 63 612.1 filed on Dec. 21, 2002, all of which are incorporated herein by reference in their entirety and for all purposes.

BACKGROUND OF THE INVENTION

The invention relates to a filtration device of the kind defined in the preamble of claim 1.

From DE 1 461 407 a vessel filter for dewatering wastewater sludge is known. The vessel filter has a pressure shell which is moveable in the longitudinal direction between two filtration positions. While filtration occurs in the position in which the pressure shell is present, in the other position the individual filter elements can be cleaned so that the cleaning action does not cause a downtime. A disadvantage of such a vessel filter is that the pressure shell itself cannot be cleaned. Accordingly, this filter cannot be used in chemical or pharmaceutical applications. The filtration moreover is carried out with individual filter elements which, for exchanging them, must be individually removed and inserted.

The invention has the object to provide a filtration device of the aforementioned kind with which realizes short downtimes with excellent cleanability of the filter housing.

SUMMARY OF THE INVENTION

This object is solved by a filtration device having the features of claim 1.

The filtration unit can be formed, for example, by one or several stacked filter layer modules, round or angled pre-pressed filter layer packages with exchangeable filter layers and reusable filter plates, one or-several stacked depth filter candles or a depth filtration roll. The separation of filtration station and loading and removing station shortens the downtimes of the filtration device because the filtration can be carried out parallel to loading and removing. Since filter housing and filter unit can be moved between the stations, not only the filter units can be removed but the filter housing can be cleaned also so that the requirements in regard to chemical and pharmaceutical applications can be fulfilled. The use of filter units instead of individual filter elements enables a quick exchange of the complete filter units. The entire filtration device can be configured for minimal volume flows with minimal downtimes so that reduced investment costs result. The filtration device can be operated manually. However, different degrees of automation can be realized to the point of fully automated operation. The degree of automation can be matched to different requirements placed on the filtration device.

It is provided that the parting plane of the filter housing extends transversely to its longitudinal axis. It can also be advantageous to arrange the parting plane parallel to the longitudinal axis of the filter housing.

Expediently, the filter housing comprises at least one compression-proof filter housing sleeve which has approximately the length of at least one filter unit arranged therein. It is provided that the loading and removing station is provided for removing a filter unit from the filter housing sleeve and for loading it into the filter housing sleeve. This is advantageous, in particular, when the filter housing sleeve remains on the filtration device and is cleaned thereat and only the filter unit is exchanged. Expediently, the loading and removing station can also be used for loading and removing filter housing sleeves with filter units arranged therein into the filtration device or from the filtration device, wherein filter units loaded into the filtration device are preferably sterilized and rinsed. This is particularly advantageous when the filter housing sleeves are cleaned and sterilized outside of the filtration device.

It is provided that the filter housing is comprised of filter housing sleeve, lid and bottom, wherein the filter housing sleeve is closed pressure-tightly by means of lid and bottom. Expediently, the loading and removing station serves for attaching the lid and bottom to the filter housing sleeve. This process step can be carried out during the filtration process taking place in the filtration station. It is provided that the filter housing sleeves, in particular, the complete filter housing, of the filtration station and the loading and removing station are interchangeable. Expediently, the loading and removing station has a rinsing and sterilization device. The rinsing and sterilization process can be carried out parallel to the filtration process. In particular, in the case of filtration devices in which the filtration time in comparison to the loading and removing time is short, it is provided that the filtration station contains a rinsing and sterilization station.

Expediently, for approximately identical processing times for filtration versus loading and removing, a separate rinsing and sterilization station is provided in the filtration device, wherein, in particular, a filter housing sleeve is movable from the loading and removing station via the rinsing and sterilization station to the filtration station. When the rinsing and sterilization process is carried out in a separate station or in the loading and removing station, an integrity test can be performed in the filtration station before operating the filter unit in order to detect leaks of the filter. In this way, waste during filtration can be reduced. Expediently, a separate cleaning station is provided which serves for cleaning the filter housing.

It is provided that the filter housing sleeve is arranged horizontally for loading and removing. In particular, filter units which have a central channel can be arranged in a horizontal position in the filter housing sleeve by means of conventional lifting devices because the lifting device can engage the central channel and no additional holding means must be provided on the filter unit. Expediently, the filter housing sleeve is arranged vertically in the filtration station. However, it can be provided that the filter housing sleeve is arranged at a slant in the filtration station. When the filter housing sleeve is arranged at a slant in the filtration station or is vertically arranged, the loading and removing station expediently is provided with a tilting device which is used for tilting the filter housing sleeve from the vertical position or slanted position into a horizontal position and back.

For receiving rotationally symmetrical filter units, the filter housing sleeve is expediently rotationally symmetrical. For receiving filter units with polygonal cross-section it is provided that the filter housing sleeve has a polygonal cross-section. Advantageously, the cross-section of the filter housing sleeve and the cross-section of the filter unit are matched to one another.

Embodiments of the invention will be explained in the following with the aid of the drawing.

DETAILED DESCRIPTION OF THE INVENTION

Figure 1:
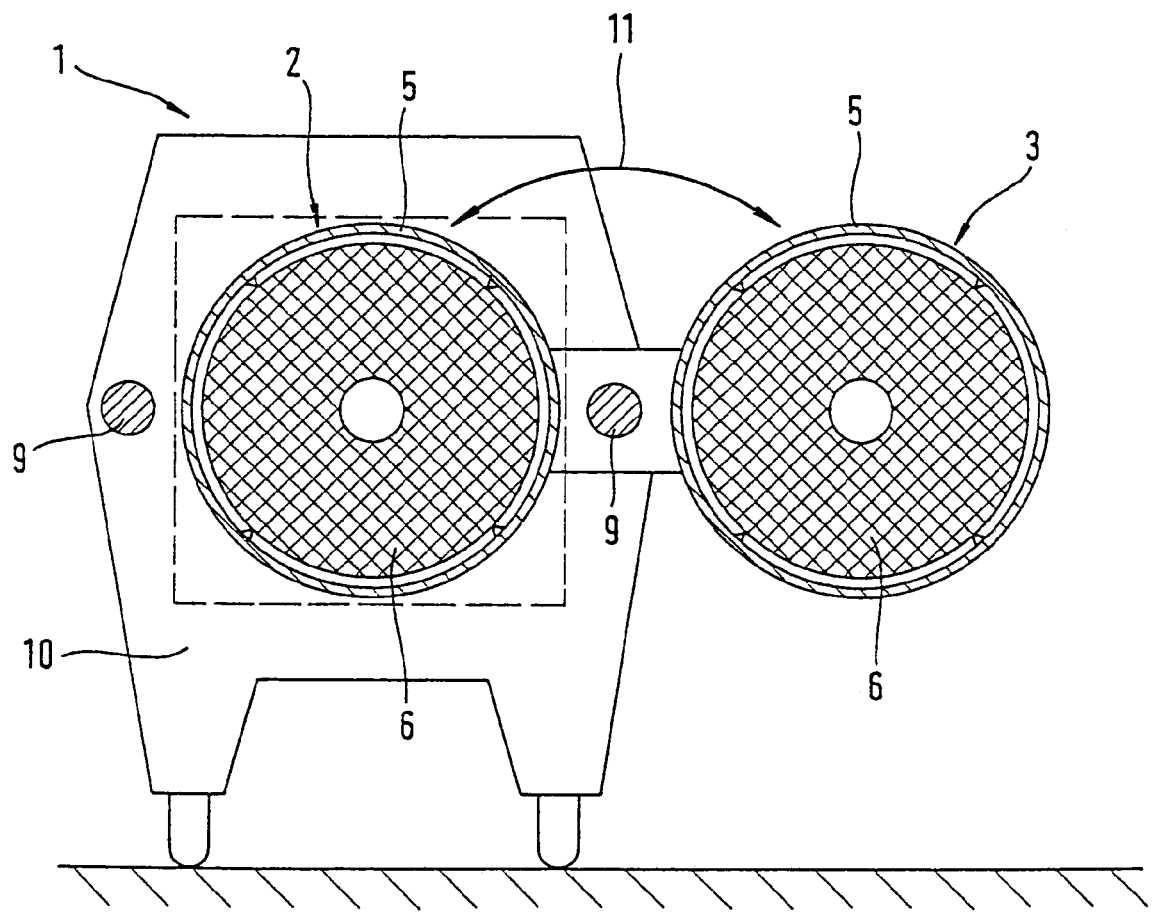
FIG. 1 a sectional illustration of a filtration device with filtration station and loading and removing station.

FIG. 1 shows a filtration device 1 comprising a filtration station 2 and a loading and removing station 3. The filtration device 1 is comprised of two end plates 10 which are connected by two rods 9. On the stationary end plate 10 the connectors for inlet and outlet lines are arranged. The oppositely positioned end plate 10 is supported movably in the longitudinal direction of the rods 9. In the loading and removing station 3 and the filtration station 2, a filtering unit 6 is arranged in a filter housing sleeve, respectively. By pivoting about a rod 9 along the arrow 11, the filter housing sleeves 5 can be exchanged. In the case of small filters, the exchange of the filter housing sleeves 5 can be carried out manually, while for large and heavy filter units the exchange is expediently carried out with the assistance of a motor.

The filter housing sleeve 5 is closed in the filtration station 2 by means of a bottom and a lid—which are not illustrated in FIG. 1—wherein bottom and lid are integrated into the end plates 10. On the bottom and on the lid sealing elements are provided which, upon pressing bottom and lid against the filter housing sleeve 5, seal the filtrate side and the unfiltered material side as well as the interior of the filter housing against the environment. The pressing of bottom and lid onto the filter housing sleeve 5 is carried out in particular by means of the movable end plate 10. During a filtration process, parallel thereto, a complete, spent filter unit 6 is removed at the loading and removing station 3, the filter housing sleeve 5 is cleaned in the loading and removing station 3, and a complete, new filter unit 6 is inserted into the filter housing 5. The rinsing and sterilization process can be performed in the filtration station 2 as well as in the loading and removing station 3 wherein, when performing it in the loading and removing station 3, in the latter already the lid and bottom must be placed onto the filter housing sleeve 5 and corresponding inlet and outlet lines must be provided.

Figure 2:
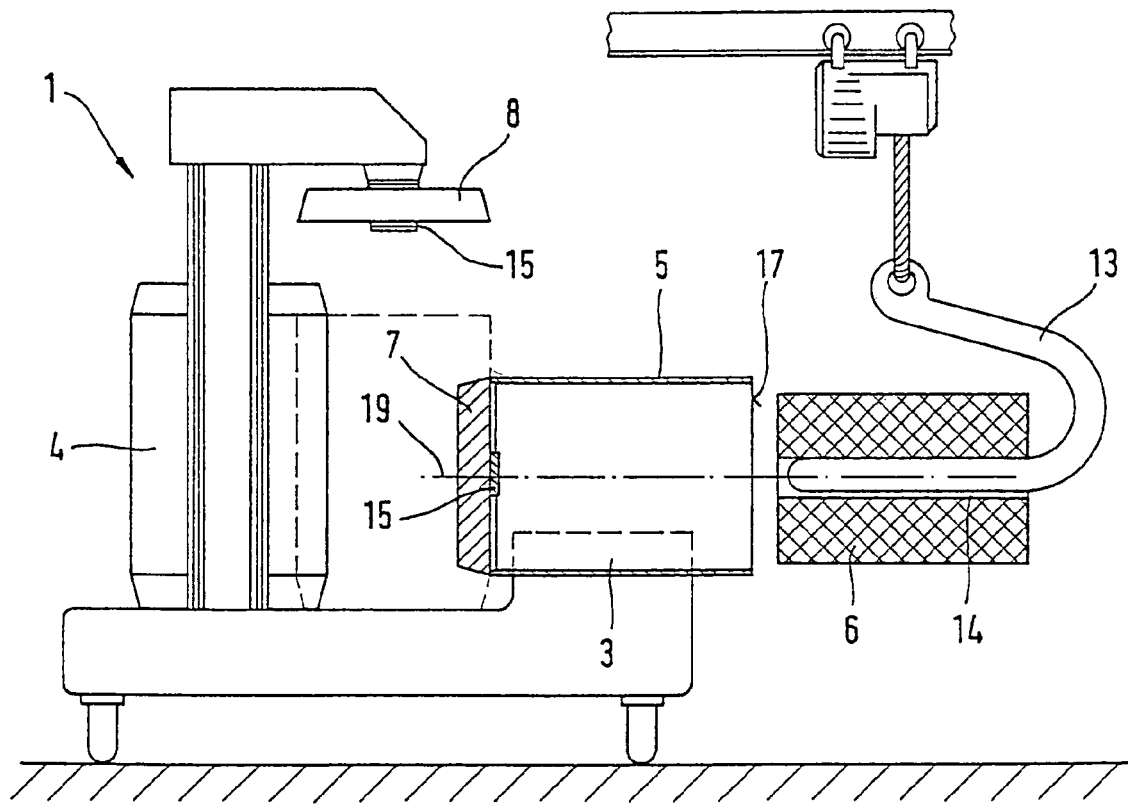
FIG. 2 a sectional view of a filtration device with loading and removing station, filtration station, and rinsing and sterilization station.
Figure 3:
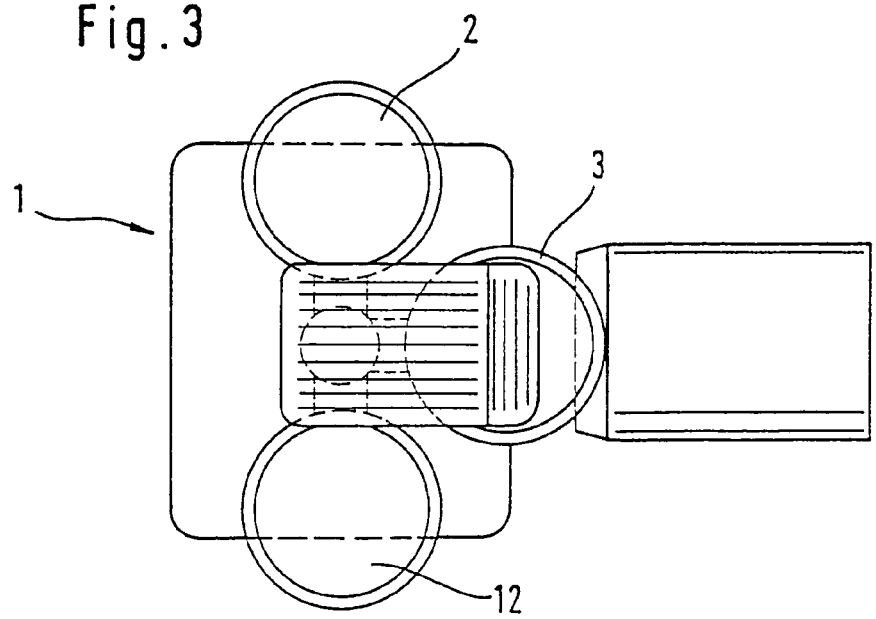
FIG. 3 a plan view onto the filtration device of FIG. 2.

In FIGS. 2 and 3, a filtration device 1 comprising a filtration station 2, loading and removing station 3, and separate rinsing and sterilization station 12 is illustrated. In the filtration station 2 and in the rinsing and sterilization station 12, the filter housing 4 is vertically arranged. The filter housing 4 is comprised of a filter housing sleeve 5 which is sealed by bottom 7 and lid 8 pressure-tightly. It can be advantageous to form the filter housing 4 of two cup-shaped halves so that the parting plane extends approximately centrally and perpendicularly to the longitudinal axis of the filter housing 4. It can also be advantageous to provide parting planes which are not centrally arranged.

In the loading and removing station 3 the filter housing sleeve 5 is horizontally arranged. The parting plane 17 of the filter housing 4 extends transversely to the longitudinal axis 19 of the filter housing. For loading and removing the filter housing sleeve 5, the lifting device 13 engages the central channel 14 of a filter unit 6. A tilting device is integrated in the loading and removing station 3 and tilts the filter housing sleeve 5 with the bottom 7 arranged thereat into the vertical position. The lid 8 is lowered and pressed onto the filter housing sleeve 5 in the vertical position thereof. A sealing edge 15 arranged on the bottom 7 and on the lid 8 can be in engagement with the filter unit 6 and seals it. The filter unit 6 is particularly already pre-pressed so that the required pressing stroke for a safe sealing action is less than 60 mm.

After completion of a filtration cycle, the filter housings 4 are moved in the illustration of FIG. 3 in the clockwise direction to the next station, respectively, so that the filter housing 4 is moved from the loading and removing station 3 into the rinsing and sterilization station 12, the filter housing 4 is moved away from the rinsing and sterilization station 12 into the filtration station 2, and the filter housing 4 is moved away from the filtration station 2 into the loading and removing station 3. However, it is also possible to exchange the filter housings 4 of the loading and removing station 3 and of the filtration station 2 and to perform in the next process step the filtration in the rinsing and sterilization station 12 and the rinsing and sterilization process in the filtration station 2. In this way, the filtration station 2 and the rinsing and sterilization station 12 are switched in the cycle. For a circular advancing movement of the filter housings 4, the inlet and outlet lines can remain connected on the filter housings while, when changing the filter housings 4, the inlet and outlet lines must be reconnected at each station.

In the filtration device illustrated in FIGS. 2 and 3 cleaning of the filter housing sleeve 5, of the lid 8, and of the bottom 7 are performed on the loading and removing station 3. However, because of the processing times, it may be advantageous to provide a separate cleaning station in the filtration device.

Figure 4:
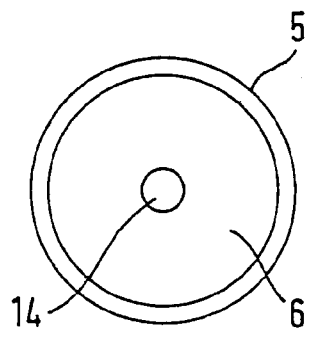
FIG. 4 a plan view onto an arrangement of a filter module in a cylindrical filter housing sleeve.
Figure 5:
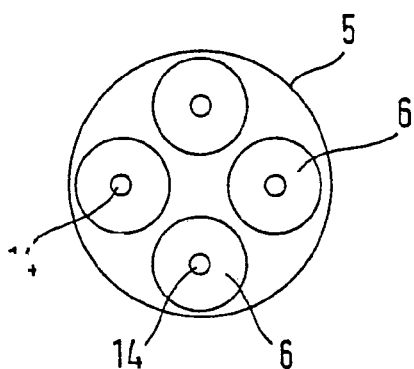
FIG. 5 a plan view onto an arrangement of four filter modules in a cylindrical filter housing sleeve.

FIGS. 4 to 9 show different arrangements of filter units 6 in filter housing sleeves 5. In FIG. 4, a cylindrical filter unit 6 is arranged in a cylindrical filter housing sleeve 5. The filter unit 6 can be comprised of several stacked individual filter modules. However, they have a common central channel 14. In FIG. 5, four cylindrical filter units 6 are arranged in a cylindrical filter housing sleeve 5. The filter units 6 can be comprised of several filter modules, respectively. Each filter unit 6 has a separate central channel 14. The individual central channels 14 must be sealed individually on the bottom and the lid of the filter housing.

Figure 6:
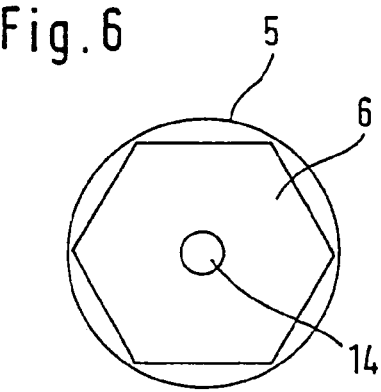
FIG. 6 a plan view onto an arrangement of an angular filter module in a cylindrical filter housing sleeve.
Figure 7:
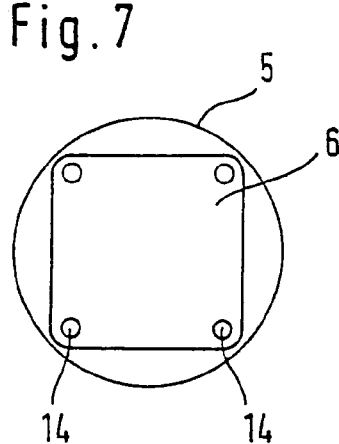
FIG. 7 an embodiment variant of FIG. 6.

In FIG. 6 a hexagonal filter unit 6 is arranged in a cylindrical filter housing sleeve 5. FIG. 7 shows a square filter unit 6 which has four central channels 14 in a cylindrical filter housing sleeve 5. It is apparent that for a standardized shape of the filter housing sleeve 5, in the present case cylindrical, differently shaped filter units 6 can be employed so that with each exchange of the filter unit 6 also an adaptation to the respective filtration process can be carried out.

Figure 8:
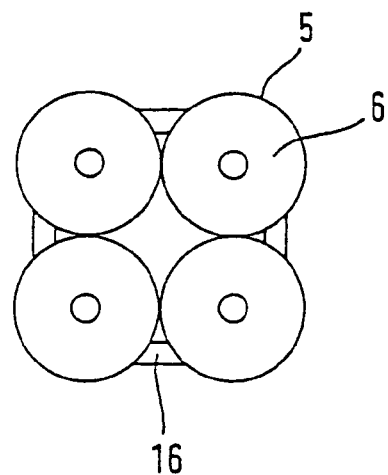
FIG. 8 a plan view onto an arrangement of four filter modules in four cylindrical filter housing, sleeves which are connected with one another.

FIG. 8 shows four filter housing sleeves 5 in which a filter unit 6 is arranged, respectively; they are connected with one another by connecting means 16. Shape and size of filter unit 6 and filter housing sleeve 5 can be matched in accordance with the required filtration surface and the required filtration materials. Also, other rotationally symmetrical shapes, deviating from the cylindrical shape, or polygonal shapes of the filter unit can be expedient. Advantageously, the cross-sections of filter unit and filter housing sleeve are matched to one another.

Figure 9:
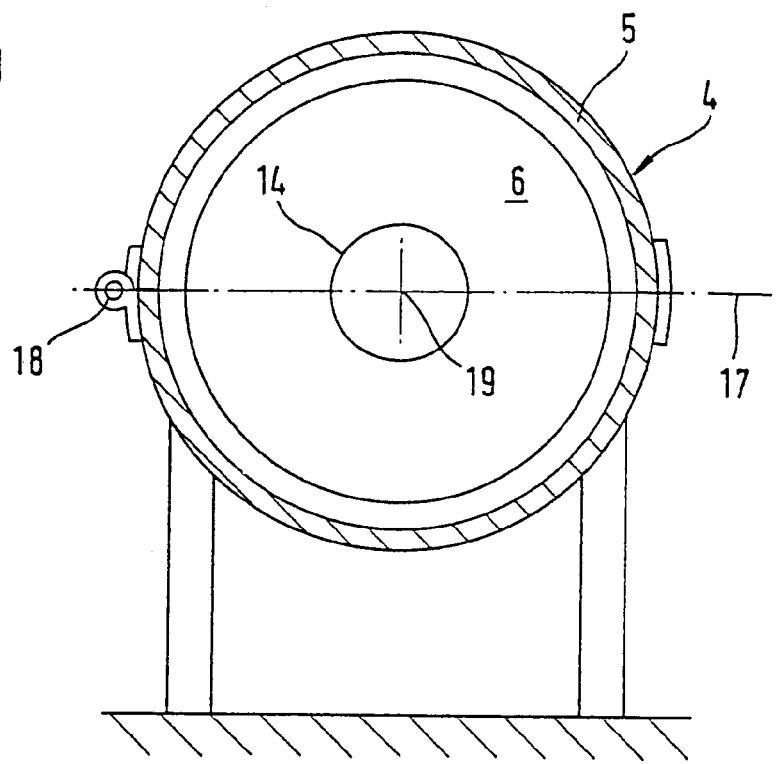
FIG. 9 a sectional illustration of the filter housing with parting plane extending parallel to the longitudinal axis.
Figure 10:
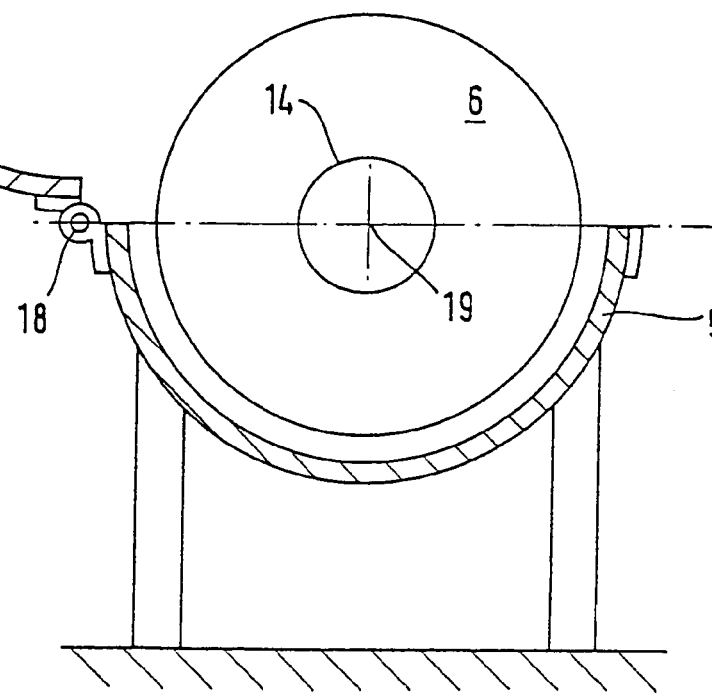
FIG. 10 the filter housing of FIG. 10 in the open state.

In FIGS. 9 and 10 a filter housing 4 is illustrated whose parting plane 17 extends parallel to the longitudinal axis 19 of the filter housing. When opening the half of the filter housing sleeve 5 arranged on top, the parting plane 17 pivots about the hinge 18 into the position illustrated in FIG. 11. In this way, the filter unit 6 can also be removed in the radial direction, relative to the longitudinal axis 19, from the filter housing 4.

The invention claimed is:

1. Filtration device comprising at least one filtration station, a loading and removing station, at least one filter unit in a closable filter housing having a longitudinal axis, and two end plates connected by two rods, wherein the filter housing with the filter unit is pivotably supported by one of the rods to move the filter housing back and forth between the loading and removing station and the filtration station, wherein in the filtration station the filter housing is positioned between said two end plates with the longitudinal axis parallel to a longitudinal direction of the rods, and wherein one of the end plates is movably supported by said rods along the longitudinal direction thereof, thereby providing the capability of opening the filter housing along a parting plane transversely to the longitudinal axis of the filter housing.

2. Filtration device according to claim 1, wherein the filter housing comprises at least one compression-proof filter housing sleeve which has approximately the length of at least one filter unit arranged therein.

3. Filtration device according to claim 2, wherein the loading and removing station serves for exchanging a filter unit arranged in the filter housing sleeve.

4. Filtration device according to claim 2, wherein the loading and removing station serves for loading the filter housing sleeve with a filter unit or removing a filter unit from the filter housing sleeve, wherein a filter unit loaded into the filter housing sleeve is sterilized and/or rinsed.

5. Filtration device according to claim 2, wherein the filter housing sleeve has end faces, wherein a lid and a bottom are provided on the end faces of the filter housing sleeve of the filter housing, and wherein the filter housing sleeve is closed pressure-tightly by the lid and bottom.

6. Filtration device according to claim 5, wherein the loading and removing station serves for attaching the lid and the bottom on the filter housing sleeve.

7. Filtration station according to claim 2, wherein the filter housing sleeve is arranged horizontally during loading and removing.

8. Filtration device according to claim 2, wherein the filter housing sleeve is rotationally symmetrical.

9. Filtration device according to claim 2, wherein the filter housing sleeve has a polygonal cross-section.

10. Filtration device according to claim 2, wherein the cross-section of the filter housing sleeve and the cross-section of the filter unit are matched to one another.

11. Filtration device according to claim 1, wherein the filter housing comprises a first filter housing sleeve, wherein the filtration device further comprises a second filter housing sleeve, the first and second filter housing sleeves being pivotably supported by said one of said rods, and wherein the filter housing sleeves are exchangeable.

12. Filtration device according to claim 1, wherein the loading and removing station comprises a rinsing and sterilization station.

13. Filtration device according to claim 1, wherein the filtration station comprises a rinsing and sterilization station.

14. Filtration device according to claim 1, wherein the filtration device further comprises a separate rinsing and sterilization station and wherein a filter housing sleeve of the filter housing is movable from the loading and removing station via the rinsing and sterilization station to the filtration station.

15. Filtration device according to claim 1, wherein the filtration device further comprises a separate cleaning station which serves for cleaning the filter housing.

\* \* \* \* \*